(12) United States Patent
Selvaraju et al.

(10) Patent No.: US 11,416,321 B2
(45) Date of Patent: Aug. 16, 2022

(54) COMPONENT FAILURE PREDICTION

(71) Applicant: Dell Products L.P., Round Rock, TX (US)

(72) Inventors: Devipriya Selvaraju, Bangalore (IN); Karthik Sethuramalingam, Bangalore (IN); Bharathi Raja Kalyanasundaram, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 207 days.

(21) Appl. No.: 16/992,452

(22) Filed: Aug. 13, 2020

(65) Prior Publication Data

US 2022/0050733 A1    Feb. 17, 2022

(51) Int. Cl.
*G06F 11/00*    (2006.01)
*G06N 20/00*    (2019.01)

(52) U.S. Cl.
CPC .......... *G06F 11/008* (2013.01); *G06N 20/00* (2019.01)

(58) Field of Classification Search
CPC .............................. G06F 11/008; G06N 20/00
See application file for complete search history.

(56) References Cited

U.S. PATENT DOCUMENTS

| | | | |
|---|---|---|---|
| 7,930,159 B1* | 4/2011 | Florissi | G06F 30/20 |
| | | | 703/13 |
| 10,693,711 B1* | 6/2020 | Garg | G06F 11/079 |
| 11,036,572 B2* | 6/2021 | Liu | G06F 11/0751 |
| 11,086,709 B1* | 8/2021 | Ratkovic | G06F 11/0709 |
| 2005/0028033 A1* | 2/2005 | Kipersztok | G06F 11/2257 |
| | | | 714/27 |
| 2018/0299877 A1* | 10/2018 | Cheng | H04L 41/00 |
| 2020/0401936 A1* | 12/2020 | Embarmannar Vijayan | G06F 11/3452 |

(Continued)

OTHER PUBLICATIONS

Wikipedia, "Soft Sensor," https://en.wikipedia.org/w/index.php?title=Soft_sensor&oldid=950565091, Apr. 12, 2020, 2 pages.

(Continued)

*Primary Examiner* — Matthew M Kim
*Assistant Examiner* — Matthew N Putaraksa
(74) *Attorney, Agent, or Firm* — Ryan, Mason & Lewis, LLP

(57) ABSTRACT

A method comprises retrieving operating conditions data comprising operational details of one or more components in at least one computing environment. Component replacement data and no fault found (NFF) data of the computing environment are also retrieved. The component replacement data comprises details about components that have been replaced in the computing environment. The NFF data comprises details about components incorrectly identified as having failed in the computing environment and symptoms leading to the incorrect identifications. The method also comprises generating a first mapping between given ones of the operational details and given ones of the replaced components, and generating a second mapping between given ones of the incorrectly identified components and given ones of the symptoms using one or more machine learning algorithms. Using the first and second mappings, at least one failed component is predicted based on one or more symptoms identified in a received support case.

20 Claims, 17 Drawing Sheets

(56) References Cited

U.S. PATENT DOCUMENTS

2021/0263735 A1\* 8/2021 Harishankar ............. G06F 8/76
2021/0281592 A1\* 9/2021 Givental ................ G06F 16/55

OTHER PUBLICATIONS

Dell, "Dell SupportAssist for PCs," https://www.dell.com/support/contents/en-us/article/product-support/self-support-knowledgebase/software-and-downloads/supportassist, Accessed Jul. 27, 2020, 2 pages.
Wikipedia, "No Fault Found," https://en.wikipedia.org/w/index.php?title=No_fault_found&oldid=951618357, Apr. 18, 2020, 4 pages.
Dell, "SupportAssist for PCs," Apr. 2018, 2 pages.
Wikipedia, "Splunk," https://en.wikipedia.org/w/index.php?title=Splunk&oldid=967814512, Jul. 15, 2020, 6 pages.

\* cited by examiner

705

```
# In[1]:    # Import libraries
from sklearn.feature_extraction.text import TfidfVectorizer
from sklearn.naive_bayes import MultinomialNB
import pandas as pd
import numpy as np
import warnings;warnings.filterwarnings('ignore')
pd.set_option('display.max_rows', 100)
from IPython.core.display import display, HTML
display(HTML("<style>.container { width:100% !important; }</style>"))

In[2]:    # Load input files

# In[3]:e1 = pd.read_csv('/mnt/NFF/VFIR_E1.txt',sep='\t')    # CRM DB data with historical issues and parts dispatched
sa_e1 = pd.read_csv('/mnt/NFF/SA_E1.txt',sep='\t')    # OCM Data with alerts and recommended parts
nff_e2 = pd.read_csv('/mnt/NFF/NFF_E2.txt',sep='\t')    # Historical issues with NFF parts
e3 = pd.read_csv('/mnt/NFF/E3_test.csv',sep='\t')    # System issues used for validation

# In[4]:e1.head()    # Display sample data from CRM DB
```

FIG. 7

| tech_support_sl_symptom | sr_case_title | tech_support_sl_symptom_sub-category | tb_comments | commodities_dispatched |
|---|---|---|---|---|
| AC ADAPTER | ac adapter not determined | AC Adapter - Not Working | N/A | Adapter AC, Chassis, Motherboard, Speaker |
| AC ADAPTER | CLV: AC Adapter not determined: NBD | AC Adapter - Not Working | CLV: AC Adapter not determined: NBD | Chassis, Motherboard |
| ACCIDENTAL DAMAGE | Accidental damage | General Queries - Warranty | N/A | Battery, Motherboard, Touchpad |
| ACCIDENTAL DAMAGE | Dropped System ACCIDENTAL DAMAGE : DSTYOH2 | General Queries - Warranty | Dropped System ACCIDENTAL DAMAGE : DSTYOH2 | Motherboard |
| automatic | CLV: RR: Automatic Repair | N/A | Automatic Repair | HardDrive, Motherboard |

In[5]: sa_e1.head()    # Display sample data from OCM DB — 805

Out[5]:

| | Alerts_message_description | commodities |
|---|---|---|
| 0 | EPSA Scan Failure | Motherboard, Memory |
| 1 | High hard disk temperatures detected | Hard Drive, Heatsink |
| 2 | High paging activity was detected | Hard Drive, Heatsink |
| 3 | Kernel crash was detected | Heatsink, Motherboard, Memory |
| 4 | LAN Adapter MAC change detected | Wireless Local Area Network |

810

In[6]: nff_e2.head()    # Display sample NFF data from CRM DB — 815

Out[6]:

| | tech_support_al_symptom | sr_case_title | tech_support_al_symptom_sub-category | tb_comments | commodities_dispatched |
|---|---|---|---|---|---|
| 0 | AUDIO ISSUES | Audio issue | Audio Device – No Sound | Diagnostic Test 1 - Headphones/Ear Plugs Diagn... | Motherboard |
| 1 | AUDIO PORT | Audio Port | Audio Device - Port | Dell Troubleshooting Log : Issue Description A... | Motherboard |
| 2 | BATTERY | 802 A/C battery issues | Battery - Not Charging | NaN | HardDrive, Memory, Heatsink, Motherboard |
| 3 | BATTERY | BATTERY COMMUNICATION FAILURE | Battery - Not Charging | Diagnostic Test : Battery Not Recognized O... | Adapter, Battery, Heatsink, Motherboard |
| 4 | BEEPS | 9 beep issue | System Warning - Beep | Dell Troubleshooting Log : Issue Not Positivel... | LCD Panel, Motherboard |

```
# In[8]:         # Handle empty values
e1    = e1.replace(np.nan, 'None', regex=True)
sa_e1 = sa_e1.replace(np.nan, 'None', regex=True)
nff_e2 = nff_e2.replace(np.nan, 'None', regex=True)
e3    = e3.replace(np.nan, 'None', regex=True)

# In[9]:         # Combine issue description columns of CRM DB
e1_X = e1['tech_support_ai_symptom'] + ' ' + e1['sr_case_title'] + ' ' + e1['tech_support_ai_symptom_sub-category'] + ' ' + e1['f9_comments']

In[10]: e1_y = e1['commodities_dispatched']     # Historical Parts dispatched

In[11]: sa_X = sa_e1['Alerts_message_description']    # OCM captured system alerts

In[12]: sa_y = sa_e1['commodities']          # Recommeded parts for OCM system alerts

In[13]: X = pd.concat([e1_X,sa_X])           # Combine CRM DB and OCM issue descriptions

In[14]: y = pd.concat([e1_y,sa_y])           # Combine CRM DB and OCM recommended Parts

# In[15]:         # Transform text to term frequency–inverse document frequency
tfivectorizer = TfidfVectorizer(stop_words='english',ngram_range=(1,2) , max_df=0.7)

In[16]: tfitrain = tfivectorizer.fit_transform(X)     # Transform the issues text into word vector

# In[17]:         # Initialize Machine Learning Model Multinomial Naive Bayes classifier suitable for classification
nb_classifier = MultinomialNB(alpha=0.0)

In[18]: nb_classifier.fit(tfitrain,y);       # Train the model with issues in tf-idf word vector with corresponding parts

# In[19]:         # Combine issue description columns of NFF data
nff_X = nff_e2['tech_support_ai_symptom'] + ' ' +nff_e2['sr_case_title'] + ' ' +nff_e2['tech_support_ai_symptom_sub-category'] + ' ' +nff_e2['f9_comments']

# In[20]: nff_y = nff_e2['commodities_dispatched']     # Historical NFF returned Parts
```

FIG. 10

```
# In[21]: tfivectorizer_nff = TfidfVectorizer(stop_words='english',ngram_range=(1,2), max_df=0.7)    # Initialize tf-idf for NFF

In[22]: tfitrain_nff = tfivectorizer_nff.fit_transform(nff_X)    # Transform the NFF issues text into word vector

In[23]: nff_classifier = MultinomialNB(alpha=0.0)    # Initialize Machine Learning Model Multinomial Naive Bayes classifier

In[24]: nff_classifier.fit(tfitrain_nff,nff_y);    # Train the model with issues in NFF wordvector with corresponding NFF parts

# In[25]:    # Combine issue description columns of new sample data used for testing
e3_X = e3['tech_support_ai_symptom'] + ' ' +e3['tech_support_ai_symptom_sub-category'] + ' ' +e3['sr_case_title'] + ' ' +e3['f9_comments']

In[26]: tfitest_e3 = tfivectorizer.transform(e3_X)    # Transform the issues in test data text into word vector which will match words in CRM DB and OCM data

In[27]: pred_e1 = nb_classifier.predict(tfitest_e3)    # Predict parts for test data using ML Model trained from CRM DB and OCM data (See 502 in FIG. 5)

In[28]: e1_prediction = pd.Series(pred_e1)

# In[29]: print(e1_prediction)
```

— 1005

```
0                                                   Hardrive, Motherboard
1                                                              Motherboard
2                                                              Motherboard
3                                           LCDPanel, Motherboard
4                     Chassis, Hardrive, Controller-cards,MBA, Hardri...
5                                    Heatsink, Motherboard
6                     Hardrive, Memory, Motherboard, Processor
7       Chassis, Hardrive, LCDPanel, Motherboard, kit...
8                                                              Motherboard
9                                                              Motherboard
10                                                             Motherboard
11                                            LCDPanel, Motherboard
dtype: object
```

```
# In[30]: e1_prediction = e1_prediction.apply(lambda x : set(map(str.strip, x.split(','))))

# In[31]:nff_test_e3 = tfivectorizer_nff.transform(e3_X)   # Transform the issues in test data
text into word vector which will match words NFF data

# In[32]:pred_nff = nff_classifier.predict(nff_test_e3)   # Predict NFF parts for test data using
ML Model trained from NFF data  (See 503 in FIG. 5)

In[33]:e2_prediction = pd.Series(pred_nff)

# In[34]:print(e2_prediction)
```

1005

```
0                                              HardDrive
1                          Chassis, HardDrive, Motherboard
2                                              HardDrive
3                          Chassis, HardDrive, Motherboard
4        Battery Chassis, Controller Cards/HBA, HardDri...
5                                  HardDrive, Motherboard
6                         HardDrive, Memory, Processor
7           Chassis, HardDrive, LCD panel, Wireless Loca...
8                         Fan Assembly, HardDrive, Heatsink
9              Fan Assembly, Heatsink, Keyboard, Speaker
10       Chassis, LCD Panel, Motherboard, Wireless Loca...
11                                              LCDPanel
dtype: object
```

```
# In[35]: e2_prediction=e2_prediction.apply(lambda x : set(map(str.strip, x.split(','))))     1005

# In[36]: ser = pd.concat([e1_prediction,e2_prediction],axis=1)
# Combine the results predicted per 502 and 503 in FIG. 5

In[37]: ser.columns = ['E1','E2']      # Name the result columns as E1 and E2

In[38]: Result = pd.DataFrame(ser)

# In[39]: Result['E3'] = Result.E1 - Result.E2
# Remove matching parts in column E2 from parts in column E1 and depict the results in column E3

In[40]: Result

# In[42]: Result.to_csv('/mnt/NFF/E3_result.csv')
```

FIG. 10 (continued)

COMPONENT FAILURE PREDICTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to information collection used for predicting failed components.

BACKGROUND

During system failures, challenges exist for customer care personnel to identify faulty components. In an effort to identify the problematic components, the customer care personnel may run several diagnostic utilities which are administered by sources within or outside of an enterprise. In some instances, for security reasons, enterprise customers will not permit use of external diagnostic utilities. In addition, a system may not be able to run diagnostic utilities, such as, for example, when the system is unable to boot.

In such situations where external diagnostics are not permitted and/or a system is incapable of running diagnostic applications, customer care personnel may use guided resolution steps, such as, for example, customer questionnaires, to identify problems and/or faulty components. However, this process is prone to error, and may result in incorrect identification of the underlying issue and/or failed component, leading to repeat dispatches and customer dissatisfaction.

SUMMARY

Illustrative embodiments provide techniques for leveraging one or more data sources and utilizing machine learning techniques to predict problematic components during system failures.

In one embodiment, a method comprises retrieving operating conditions data of at least one computing environment. The operating conditions data comprises operational details of one or more components in the at least one computing environment. The method also includes retrieving component replacement data and no fault found (NFF) data of the at least one computing environment. The component replacement data comprises details about a plurality of components that have been replaced in the at least one computing environment. The NFF data comprises details about a plurality of components incorrectly identified as having failed in the at least one computing environment and a plurality of symptoms leading to the incorrect identifications. A first mapping between given ones of the operational details and given ones of the plurality of replaced components is generated using one or more machine learning algorithms, and a second mapping between given ones of the plurality of incorrectly identified components and given ones of the plurality of symptoms leading to the incorrect identifications is generated using the one or more machine learning algorithms. The method further comprises receiving a support case identifying one or more symptoms in the at least one computing environment, and predicting, using the first and second generated mappings, at least one failed component based on the one or more symptoms.

These and other illustrative embodiments include, without limitation, methods, apparatus, networks, systems and processor-readable storage media.

BRIEF DESCRIPTION OF THE DRAWINGS

FIG. 7 depicts an example listing of data from a customer relationship management (CRM) database and example pseudocode used in connection with executing the display of the CRM data in an illustrative embodiment.

FIG. 8 depicts example listings of operating conditions monitoring (OCM) data and NFF data, and example pseudocode used in connection with executing the display of the OCM and NFF data in an illustrative embodiment.

FIG. 9 depicts an example listing of validation data and example pseudocode used in connection with executing the display of the validation data in an illustrative embodiment.

FIG. 10 depicts example pseudocode for a variety of tasks in connection with automatically predicting failed components in computing environments including performing processes described in connection with FIGS. 3, 4 and 5 in an illustrative embodiment.

DETAILED DESCRIPTION

Figure 1:
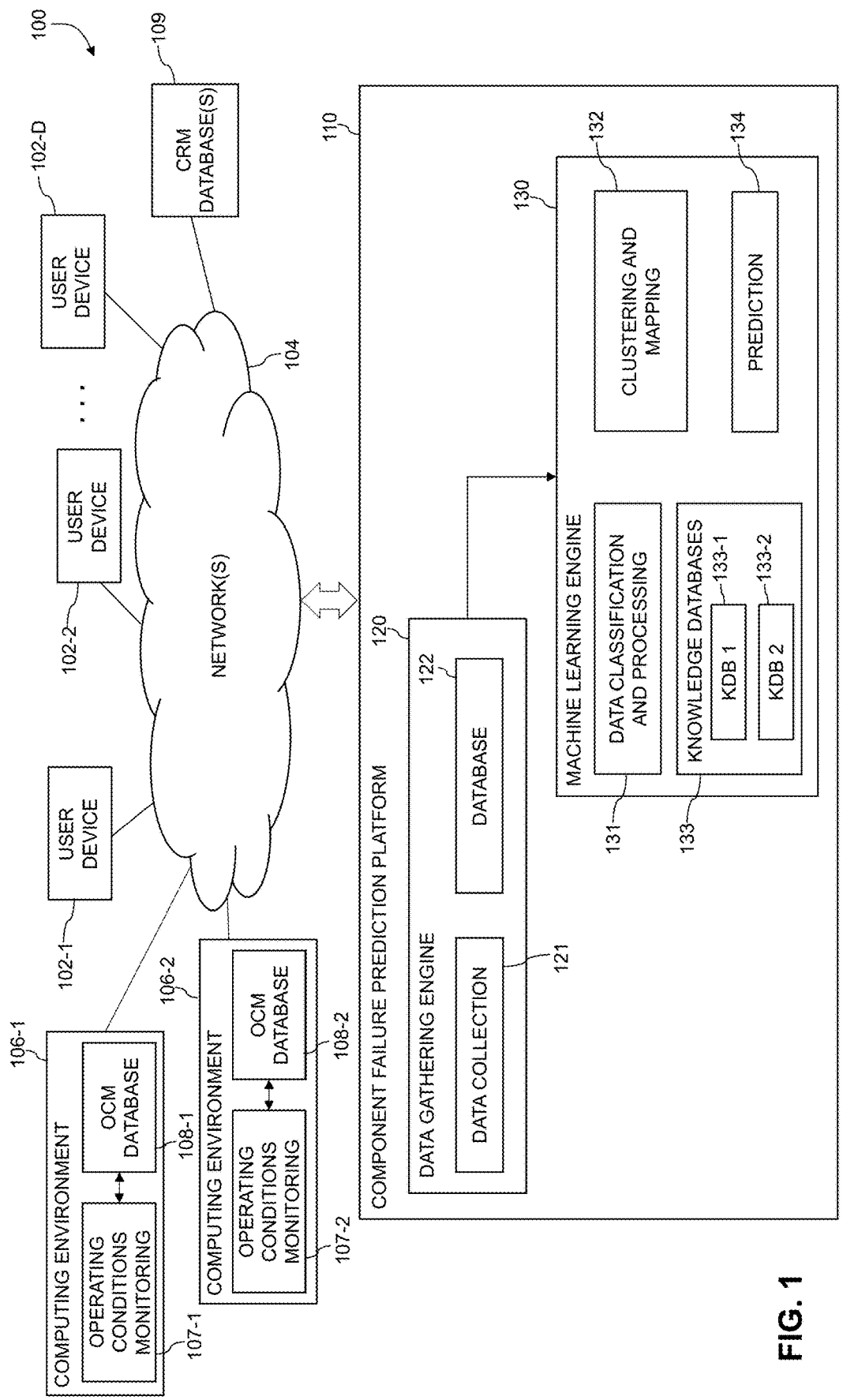
FIG. 1 depicts details of an information processing system with a component failure prediction platform for automatically predicting failed components in computing environments according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "component" is to be broadly construed, and can refer to various parts, hardware components and/or software components such as, but not necessarily limited to, storage devices (e.g., hard drives), batteries, chassis, display panels, motherboards, controllers, cards, heat sinks, fans, fan assemblies, processors, ports, host bus adaptors (HBAs), speakers, keyboards, memories, servers, switches, networks or other elements of a computing environment that may fail or malfunction.

As used herein, "no fault found" or "NFF" relates to when a component is reported to technical support or some other entity as having a problem and/or as having failed or malfunctioned, and is checked for issues or problems, but no issues or problems are found with the component. Consequently, no corrective action is performed with respect to that component, and the component is returned to service. NFF data includes, but is not necessarily limited to, details regarding the symptoms leading to diagnosis of a problem or issue with a component, the component that was wrongly identified as having the problem or issue and the diagnostic details about the returned NFF component.

Illustrative embodiments provide techniques for leveraging one or more data sources and utilizing machine learning techniques to predict problematic components in response to system failures. Various metrics, such as, for example, sensor information, storage device read or write failures, random access memory (RAM) failures and other operating conditions data, are collected from system devices on a periodic basis. In addition, historical component replacement details are collected from CRM databases. Using machine learning, patterns are identified between the operating conditions data and component replacements that have occurred in the past.

Additionally, CRM databases may contain large amounts of NFF data. As noted above, NFF data includes, for example, symptom details leading to the diagnosis of problems or issues, components wrongly identified as having problems or issues and diagnostic details about returned NFF components. Using machine learning techniques, the embodiments further identify patterns establishing relationships between the symptoms and the returned components. The machine learning techniques are further used to combine the first identified patterns between the operating conditions data and past component replacements with the second identified patterns corresponding to the relationships between the symptoms and the returned parts to predict parts that may have failed in connection with a pending support case in which failure symptoms have been identified.

FIG. 1 shows an information processing system 100 configured in accordance with an illustrative embodiment. The information processing system 100 comprises user devices 102-1, 102-2, . . . 102-D (collectively "user devices 102"). The user devices 102 communicate over a network 104 with a component failure prediction platform 110.

The user devices 102 can comprise, for example, Internet of Things (IoT) devices, desktop, laptop or tablet computers, mobile telephones, or other types of processing devices capable of communicating with the component failure prediction platform 110 and each other over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as L and P are assumed to be arbitrary positive integers greater than or equal to two.

The terms "client", "customer" or "user" herein are intended to be broadly construed so as to encompass numerous arrangements of human, hardware, software or firmware entities, as well as combinations of such entities. Component failure prediction services may be provided for users utilizing one or more machine learning models, although it is to be appreciated that other types of infrastructure arrangements could be used. At least a portion of the available services and functionalities provided by the component failure prediction platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the component failure prediction platform 110, as well as to support communication between the component failure prediction platform 110 and connected devices (e.g., user devices 102) and/or other related systems and devices not explicitly shown.

Users may refer to customers, clients and/or administrators of computing environments for which component failures are being predicted. For example, in some embodiments, the user devices 102 are assumed to be associated with repair technicians, system administrators, information technology (IT) managers, software developers release management personnel or other authorized personnel configured to access and utilize the component failure prediction platform 110.

The information processing system 100 further includes computing environment 106-1 and computing environment 106-2 (collectively "computing environments 106") connected to the user devices 102 and to the component failure prediction platform 110 via the network 104. The computing environments 106 comprise components such as, for example, storage devices, batteries, chassis, display panels, motherboards, controllers, cards, heat sinks, fans, fan assemblies, processors, ports, HBAs, speakers, keyboards and memories which are connected over one or more networks like network 104 and/or through direct wired connections. The component failure prediction platform 110 generates component failure predictions for the computing environments 106 for users such as, for example, data center administrators, so that the users can perform or commence performance of remedial measures to address and/or fix component failures predicted by the platform 110, or the system 100 may automatically perform or commence performance of remedial measures based on the failed component predictions made by the platform 110. A non-limiting example of one of computing environments 106 for which the component failure prediction platform 110 is configured to generate component failure predictions is a data center. However, the component failure prediction platform 110 can generate component failure predictions for any computing environment comprising multiple components and devices, which may be connected to each other over one or more networks and/or through direct wired connections. Moreover, although two computing environments 106-1 and 106-2 are shown, the embodiments are not necessarily limited thereto, and more or less computing environments 106 may be part of the information processing system 100.

The computing environments 106 each include first and second operating conditions monitoring (OCM) layers 107-1 and 107-2 (collectively "OCM layers 107") and first and second OCM databases 108-1 and 108-2 (collectively "OCM databases 108"). The OCM layers 107 monitor performance and health of hardware and software in the computing environments 106. The OCM layers 107 periodically collect operating conditions data comprising, for example, various operational details related to events occurring in the computing environments 106, and store the collected operational details in the OCM databases 108. The events include, but are not necessarily limited to, scan failures, read failures, write failures, memory failures, high component temperatures (e.g., exceeding a given temperature threshold), high levels of paging activity (e.g., exceeding a given activity threshold), crashes of the components (e.g., kernel and hard drive crashes), booting issues and address changes (e.g., media access control address (MAC address) changes). Some example events from one or more OCM databases 108 are shown in the data listing 810 in FIG. 8, and include alert messages such as scan failure, high hard disk temperature detected, high paging activity detected, kernel crash detected and LAN adapter MAC change detected. Recommended components that may need to be replaced corresponding to the alert messages are also identified, and include, for example, motherboards, memories, hard drives, heat sinks and wide local area networks (WLANs).

The collected operational details may further include performance metrics such as, but not necessarily limited to, throughput, latency, memory capacity and usage, response and completion time, channel capacity and bandwidth which may be collected via sensors or other equipment or software associated with the OCM layers 107. In addition, according to one or more embodiments, when issues are detected, the OCM layers 107 send system state information related to the detected issues to administrative users (via, for example, user devices 102) and/or to the component failure prediction platform 110 for troubleshooting and component failure prediction to be initiated.

Figure 2:
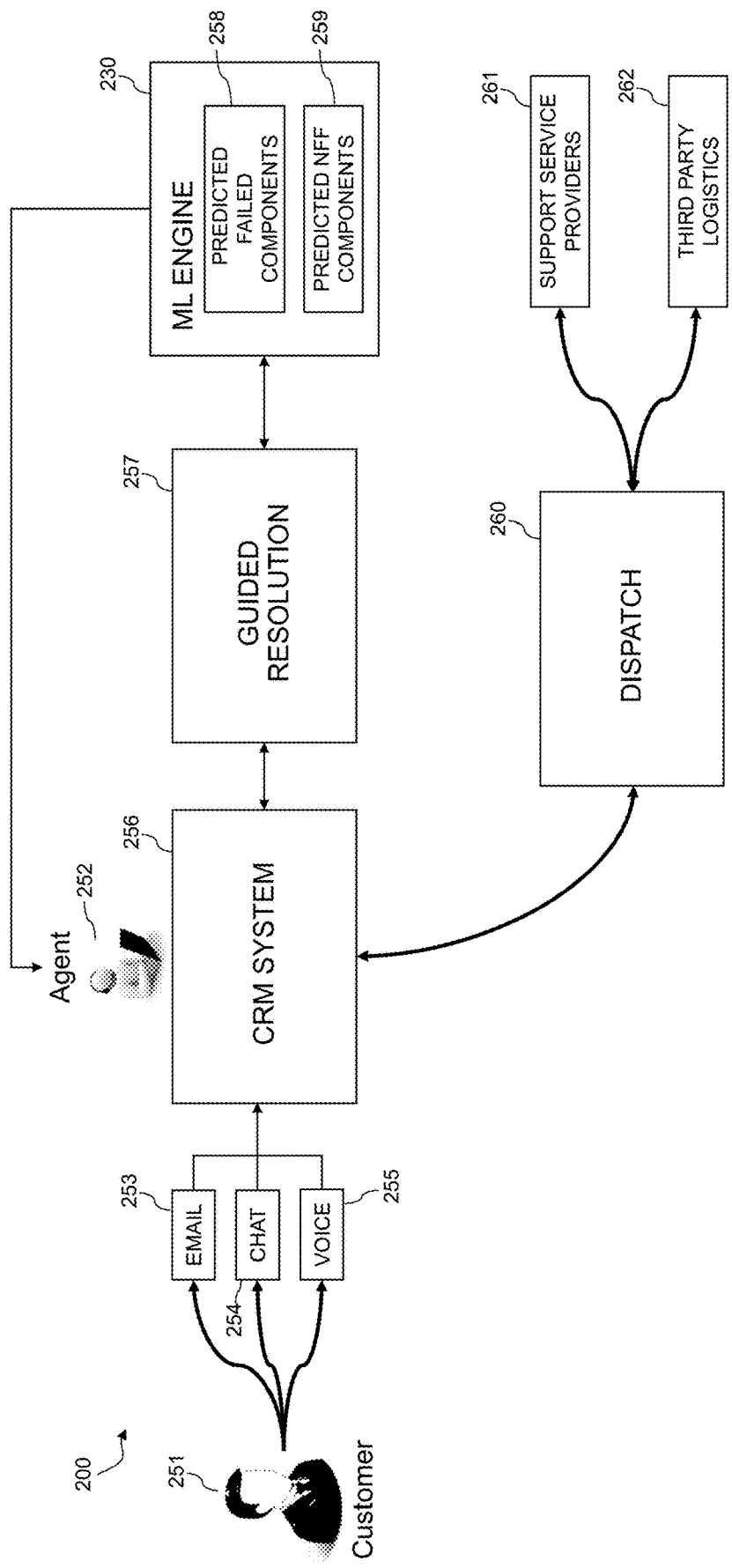
FIG. 2 depicts details of an operational flow for automatically predicting failed components in computing environments according to an illustrative embodiment.

The information processing system 100 further includes one or more CRM databases 109 connected to the network 104. According to one or more embodiments, the CRM databases 109 include numerous instances of NFF data included in technical support ticket and case data. For example, referring to the operational flow 200 in FIG. 2, the technical support ticket and case data originates from a customer 251 contacting a customer care/technical support agent 252 using, for example, different communication channels such as, for example, email 253, online chat 254 and voice 255 via, for example, a telephone. In one embodiment, the customer care/technical support agent 252 creates tickets and/or cases based on details about encountered problems, issues and/or failures noted by the customer 251. The tickets and/or cases from the customer care/technical support agent 252 are compiled by a CRM system 256, which can be a backend system of an enterprise. According to one or more embodiments, the customer care/technical support agents 252 use guided resolution steps 257 such as, for example, questionnaires for customers 251, in an attempt to identify and/or gather details about a problem and what components may have failed and/or malfunctioned.

Once the technical support ticket and cases have been processed and/or resolved, additional data is provided to and stored in the CRM databases 109. For example, as noted herein, NFF data is stored in the CRM databases 109. For each returned component where no problems or issues were found, the NFF data includes symptoms leading to the incorrect identification of the failed or malfunctioning component, details about the wrongly identified component, and diagnostic details associated with the conclusion that the component has not failed or malfunctioned. The CRM databases 109 also include details about components that were found to have failed or malfunctioned and were replaced. For each replaced component, the data includes symptoms leading to the correct identification of the failed or malfunctioning component, details about the component and its replacement, and diagnostic details associated with the conclusion that the component failed or malfunctioned and required replacement. According to one or more embodiments, symptoms in NFF data and/or in data corresponding to replacement components include, but are not necessarily limited to, warning indications, failed operations, reduced performance, lack of power and intermittent functionality.

Some example symptoms from one or more CRM databases 109 are shown in the data listing 710 in FIG. 7, and include AC adapter not determined/not working, accidental damage, and dropped system. Dispatched components corresponding to the symptoms include, for example, adapters, chassis, motherboards, speakers, batteries, touchpads and hard drives.

Sample NFF data from one or more CRM databases 109 is shown in the data listing 820 in FIG. 8, and includes symptoms such as, for example, audio issues, no sound, audio port, battery not charging, communication failure and warning beeps. The data also includes diagnostic test and troubleshooting log information and dispatched components including, for example, motherboards, hard drives, memories, adapters, batteries, heat sinks and LCD panels.

Figure 9:
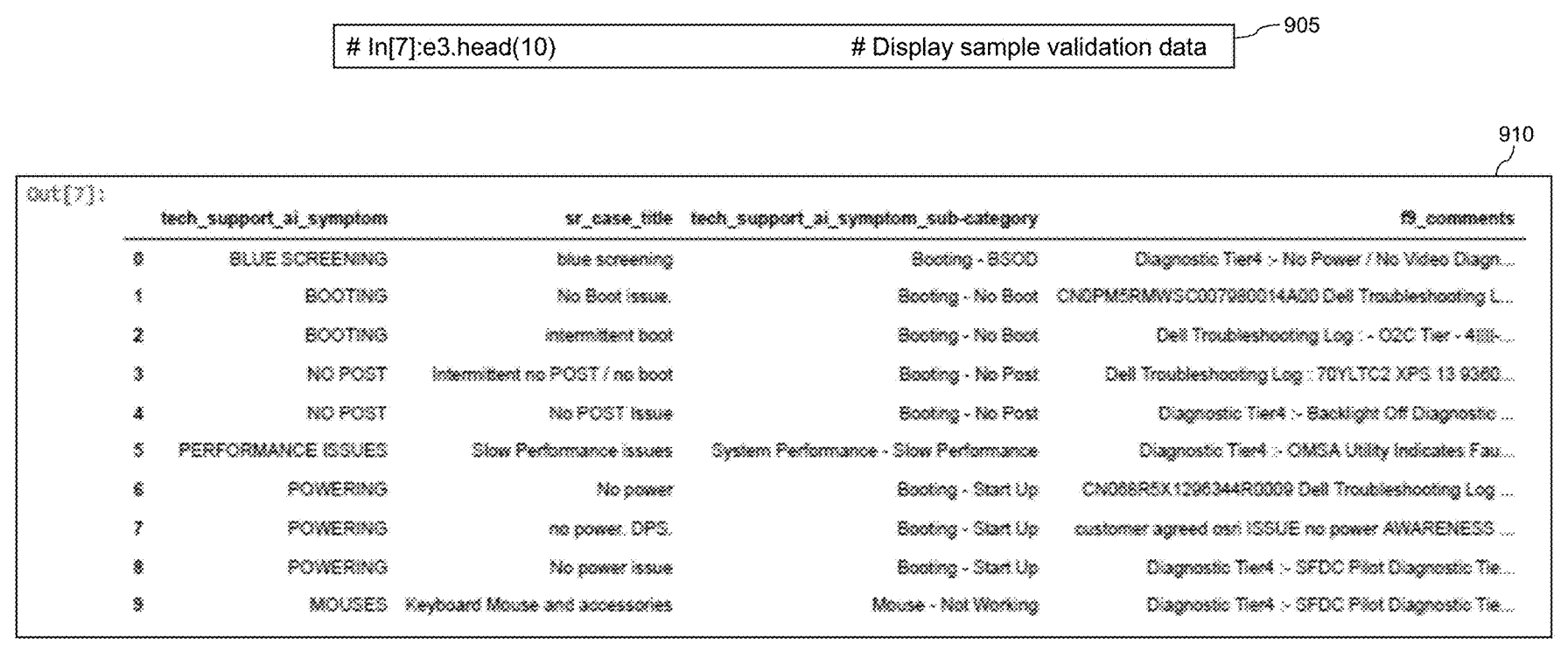

Sample validation data associated with corresponding symptoms from one or more CRM databases 109 is shown in the data listing 910 in FIG. 9, and includes symptom descriptors such as, for example, blue screen, no boot, intermittent boot, intermittent no boot or no post, no post, slow performance, no power and keyboard and/or mouse not working, and corresponding comments such as, for example, diagnostic and troubleshooting performed and customer responses.

The component failure prediction platform 110 in the present embodiment is assumed to be accessible to the user devices 102, and vice-versa, over the network 104. In addition, the component failure prediction platform 110 and the user devices 102 can access the computing environments 106 and the CRM databases 109 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The component failure prediction platform 110, on behalf of respective infrastructure tenants each corresponding to one or more users associated with respective ones of the user devices 102 provides a platform for automatically predicting failed components for multiple scenarios in the computing environments 106.

Referring to FIG. 1, the component failure prediction platform 110 comprises a data gathering engine 120 and a machine learning engine 130. The data gathering engine 120 includes a data collection layer 121 and a database 122. The machine learning engine 130 includes a data classification and processing layer 131, a clustering and mapping layer 132, knowledge databases 133 comprising at least a first knowledge database 133-1 and second knowledge database 133-2 and a prediction layer 134.

Referring to the system 100 in FIG. 1, according to one or more embodiments, the data collection layer 121 of the data gathering engine 120 collects operating conditions data (as described herein above) from OCM layers 107 and/or OCM databases 108 of the computing environments 106. In addition, the data collection layer 121 of the data gathering engine 120 collects NFF data and component replacement data (as described herein above) from CRM databases 109. The collected data may be stored in one or more databases 122. In an embodiment, the data collection component 121 is integrated with the OCM layers 107 of the computing environments 106. The data collection component 121 may have complete access to the OCM layers 107 and OCM databases 108 using one or more application programming interface protocols such as, for example, Redfish® representational state transfer (REST) protocol.

FIG. 7 includes sample pseudocode 705 (e.g., Python® code) used for the retrieval of data from OCM layers and/or OCM databases 107 and 108, and from CRM databases 109. For example, the commands shown in the pseudocode 705 request CRM data identifying historical issues and corresponding dispatched components, OCM data with alerts and recommended components, CRM data identifying historical issues and corresponding NFF components and CRM data identifying system issues used for validation. The sample pseudocode 705 in FIG. 7 also includes commands for the display of data of CRM databases 109 identifying historical issues and corresponding dispatched components. The sample pseudocode 805 and 815 in FIG. 8 includes commands for the display of OCM data with alerts and recommended components for the display of CRM data identifying historical issues and corresponding NFF components, respectively. The sample pseudocode 905 in FIG. 9 includes commands for the display of CRM data identifying system issues used for validation.

The collected OCM and CRM data from the data gathering engine 120 is input to the machine learning engine 120. The inputted data is classified and analyzed by a data classification and processing layer 131 of the machine learning engine 130. The data classification and processing layer 131 filters the data and tags and/or classifies the data into different categories. For example, referring to FIG. 1 and to the operational flow 300 in FIG. 3, the data classification and processing layer 131 categorizes and filters component replacement data from historical technical support ticket and case data retrieved the CRM database 109. In addition, the data classification and processing layer 131 categorizes and filters operating conditions data from the OCM layers 107 and/or OCM databases 108 based on characteristics such as, but not necessarily limited to, types of performance metrics, alerts and/or events.

Figure 4:
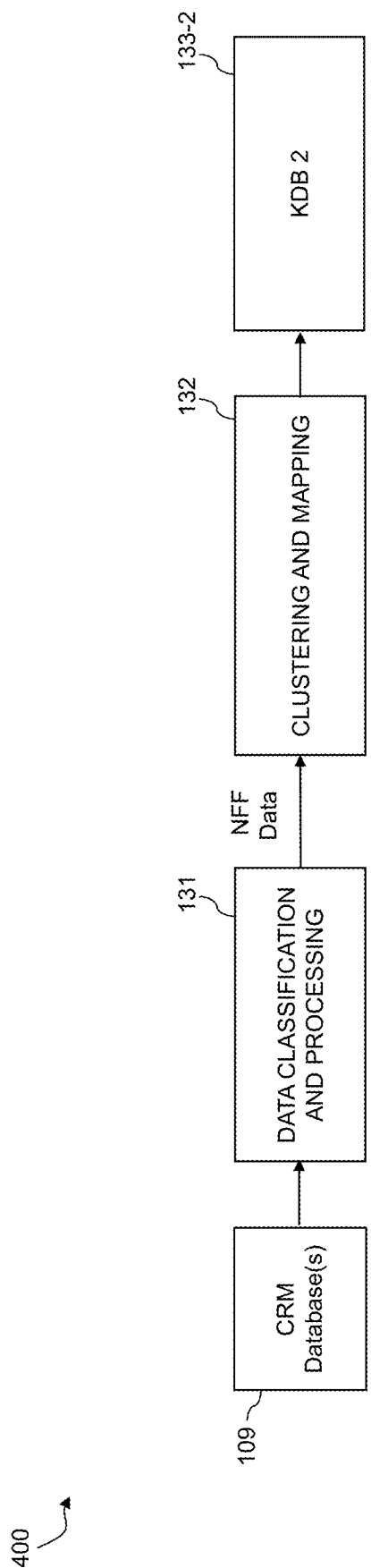
FIG. 4 depicts details of an operational flow for automatically determining components wrongly identified as failed components based on no fault found (NFF) data according to an illustrative embodiment.

Referring to FIG. 1 and to the operational flow 400 in FIG. 4, the data classification and processing layer 131 also categorizes and filters NFF data from historical technical support ticket and case data retrieved the CRM database 109. The categorized and filtered NFF data can be further classified based on components incorrectly identified as having failed and symptoms and/or error descriptions leading to the incorrect identifications.

The data classification and processing layer 131 filters the data in such a way that the required information from big un-structured and structured data sets is collected from the computing environments (e.g., OCM layers and/or OCM databases 107 and 108) and other sources (e.g. CRM databases 109) and sorted for further analysis in the machine learning engine 130.

FIG. 10 includes sample pseudocode 1005 (e.g., Python® code) used for the retrieval and processing of the data from OCM layers and/or OCM databases 107 and 108, and from CRM databases 109. For example, in connection with the processing of data by the data classification and processing layer 131, the commands shown in the pseudocode 1005 handle empty values, combine issue description columns for the data, capture data corresponding to dispatched components, system alerts and recommended components for system alerts, and combine data from CRM databases 109 and OCM sources 107 and 108 (e.g., issue descriptions and recommended components).

The pseudocode 1005 also includes commands related to applying term frequency-inverse document frequency (tf-idf) analysis to the operating conditions data, the component replacement data and/or the NFF data from the CRM databases 109 and OCM sources 107 and 108. For example, the data classification and processing layer 131 computes a plurality of tf-idf scores for data associated with a particular feature or a plurality of combinations of features. In determining frequencies of use of words in the component replacement data and/or the NFF data, tf-idf is utilized to identify and rank key words or phrases based on a term's or phrase's frequent appearance in a particular category or categories of data and lack of or infrequent appearance in a corpus, wherein the corpus is, for example, a plurality of data categories. For example, tf-idf refers to a numerical statistic reflecting the importance of a word to a category with respect to a corpus. The tf-idf value increases proportionally to the number of times a word appears in the category, but is also offset by the frequency of the word in the corpus, taking into account that some words are generally more common than others.

FIG. 10 also includes sample pseudocode 1005 used for initializing machine learning models for classification of data (e.g., a multinomial Naïve Bayes classifier), transforming textual data (e.g., issues text) into word vectors, and training the machine learning models with the word vectors. For example, the machine learning models are trained with operating conditions and/or symptoms in tf-idf word vectors and corresponding replaced and/or NFF components.

Figure 3:
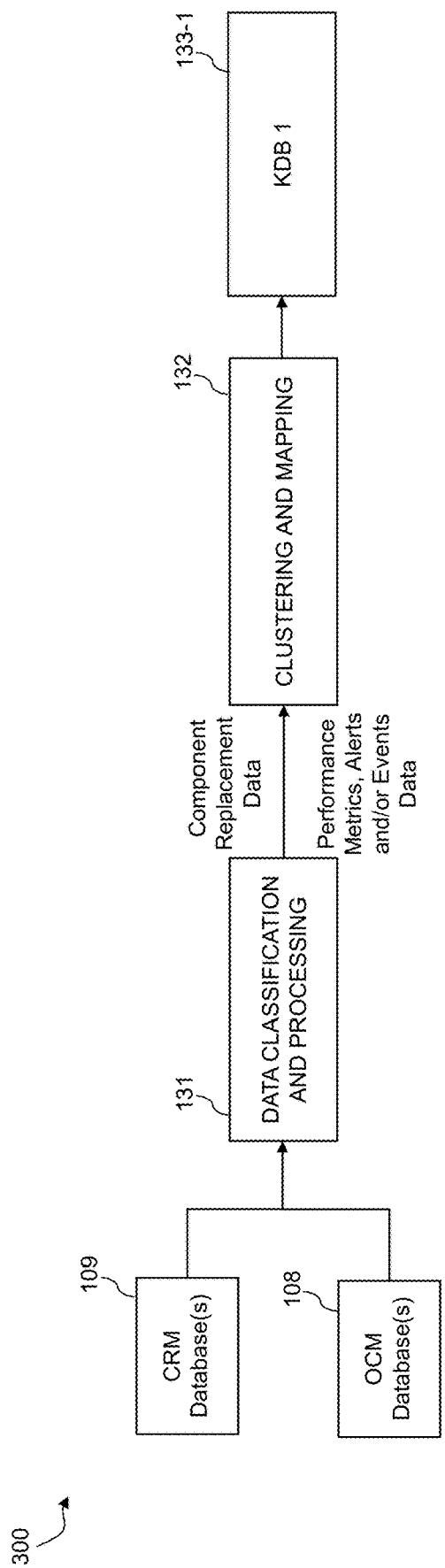
FIG. 3 depicts details of an operational flow for automatically predicting a most probable component failure based on historical component data and operating conditions data according to an illustrative embodiment.

Referring to FIGS. 1, 3 and 4, after classification, tagging and filtering the data into different categories as explained herein, the data classification and processing layer 131 sends the data to a clustering and mapping layer 132. Referring to FIG. 3, the clustering and mapping layer 132 generates a first mapping between given ones of the operational details (e.g., performance metrics, alerts and/or events) and given ones of the replaced components. The first mapping is generated using one or more machine learning algorithms configured to, for example, cluster a plurality of replaced components according to one or more categories of the operational details. The characteristics are plotted in clusters to identify probable mappings between replaced components and different categories of operational details. Each cluster provides a visualization of an approximate number of replaced components falling under a particular subgroup for each operational details cluster category. According to the operational flow 300 in FIG. 3, the most probable component failures for a variety of operational conditions are predicted by fetching historical component replacement data from the CRM databases 109 and operational conditions data from the OCM layers and/or databases 107, 108. By using, for example, machine learning clustering techniques, characteristics of operating condition observations are plotted to generate visualizations of patterns between operating condition characteristics and replaced components. The resulting mappings are maintained in first knowledge database 133-1. According to one or more embodiments, the generated visualizations may be provided to one or more users (e.g., via user devices 102).

Referring to FIG. 4, the clustering and mapping layer 132 generates a second mapping between given ones of a plurality of incorrectly identified components and given ones of a plurality of symptoms leading to the incorrect identifications. The second mapping is generated using one or more machine learning algorithms configured to, for example, cluster the plurality of incorrectly identified components according to one or more of the plurality of symptoms. For example, the plurality of incorrectly identified components are clustered according to one or more error descriptions associated with the plurality of symptoms. The characteristics are plotted in clusters to identify probable mappings between incorrectly identified components and different categories of symptoms. Each cluster provides a visualization of an approximate number of incorrectly identified components falling under a particular subgroup for each symptom cluster category. According to the operational flow 400 in FIG. 4, the most probable components that were wrongly identified for given symptoms are predicted from NFF data gathered from CRM databases 109. By using, for example, machine learning clustering techniques, characteristics of symptoms and/or error descriptions are plotted to generate visualizations of patterns between symptoms and/or error descriptions and the wrongly identified components. The resulting mappings are maintained in second knowledge database 133-2. According to one or more embodiments, the generated visualizations may be provided to one or more users (e.g., via user devices 102).

Figure 5:
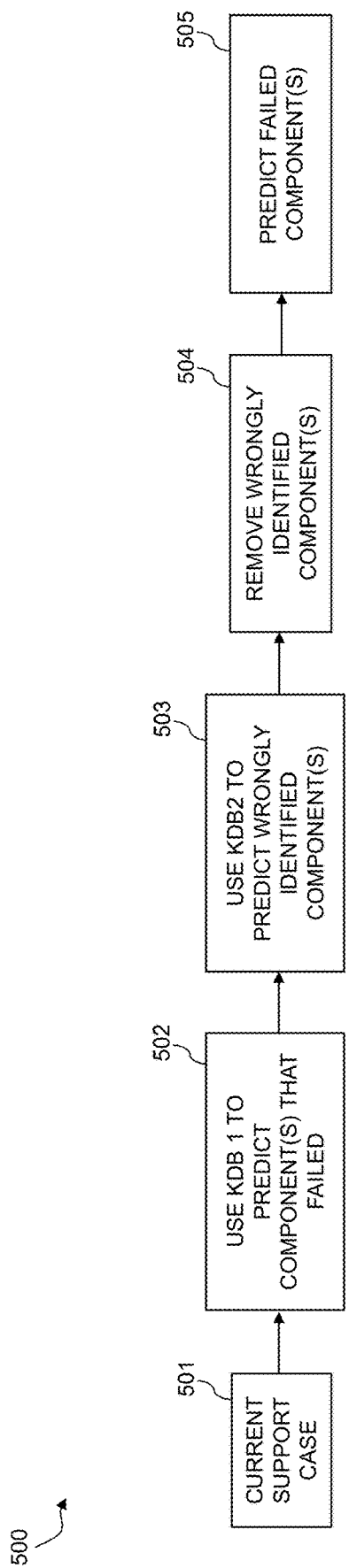
FIG. 5 depicts details of an operational flow for eliminating components wrongly identified as failed components in connection with automatically predicting failed components according to an illustrative embodiment.

Referring to FIG. 1 and to the operational flow 500 in FIG. 5, at block 501, a current support case identifying one or more symptoms and/or operational conditions data associated with a problem and/or issue in a computing environment 106 is received by the component failure prediction platform 110. As described above in connection with FIGS. 7-9, some example symptoms include, but are not necessarily limited to, warning indications, failed operations, reduced performance, lack of power and intermittent functionality. As described above in connection with FIG. 8, some example operational conditions data includes, but is not necessarily limited to, performance metrics and events such as scan failures, read failures, write failures, memory failures, high component temperatures, high levels of paging activity, crashes of the components, booting issues and address changes. Referring back to the pseudocode 1005 in FIG. 10, the data classification and processing layer 131 also combines issue description columns for incoming symptom and/or operational conditions data associated with a current support case and transforms the incoming textual data into word vectors to match with the processed data from the CRM database 109 and OCM sources 107 and 108.

At block 502, using the first knowledge database 133-1, the prediction layer 134 uses machine learning techniques to predict components that may have failed based on the incoming symptoms and/or operational conditions data received with the current support case. Failed components are predicted by comparing the data from the knowledge database 133-1 to the incoming symptoms and/or operational conditions data. Failure may be predicted for more than one component as the symptoms and operational conditions data can match with one or more component failures.

The pseudocode 1005 in FIG. 10 includes commands for executing the prediction of components that may have failed based on the incoming symptoms and/or operational conditions data received with the current support case (block 502) and displaying the results of the prediction. For example, referring to the example component listing 1010 in FIG. 10, examples of predicted failed components for different symptoms and/or operational conditions are shown in each line of the component listing 1010.

At block 503, using the second knowledge database 133-2, the prediction component 134 uses machine learning techniques to predict incorrect component failure identifications based on the incoming symptoms and/or operational conditions data received with the current support case. Components that would be incorrectly identified as having failed based on the incoming data are predicted by comparing the data from the knowledge database 133-2 to the incoming symptoms and/or operational conditions data. Results may include multiple components that would be incorrectly identified as having failed for respective symptoms and/or operational conditions. At block 504, the components predicted to be incorrectly identified as having failed at block 503 are compared with the predicted failed components obtained in step 502, and matching components from steps 502 and 503 are removed to remove false positives. Following the removal, at block 505, a final list of predicted failed components for the current case is generated and provided to a user (e.g., via user device 102).

The pseudocode 1005 in FIG. 10 further includes commands for executing the prediction of incorrect component failure identifications based on the incoming symptoms and/or operational conditions data received with the current support case (block 503) and displaying the results of the prediction. For example, referring to the example component listing 1020 in FIG. 10, examples of components that would be incorrectly identified as having failed based on the incoming data are shown in each line of the component listing 1020, where each line corresponds to different symptoms and/or operational conditions.

The pseudocode 1005 in FIG. 10 further includes commands associated with block 504 for comparing components predicted to be incorrectly identified as having failed at block 503 with the predicted failed components obtained in step 502, and removing matching components from steps 502 and 503. The pseudocode 1005 also includes a command for displaying the final prediction as a result of the removal of matching components. For example, referring to the example chart 1030 in FIG. 10, a first column includes the predicted failed components from listing 1010, the second column includes the components that were predicted to be incorrectly identified as having failed based on the incoming data from component listing 1020, and the third column shows the remaining predicted failed components following the removal of the matching components between the first and second columns. In some cases, for a given row, if each of the components in the first column has a match in the second column, then a null set (i.e., no predicted failed components) results in the third column. As can be seen in the chart 1030, for each given row, components in the second column that match the components in the first column are removed so that the third column lists the remaining components from the first column after the removal.

Accordingly, the component failure prediction platform 110 uses the first and second mappings to remove false positives when predicting failed components for given circumstances of a current technical support scenario. Failed components are predicted based on the first knowledge database 133-1, and incorrectly identified failed components are predicted based on the second knowledge database 133-2. The prediction layer 134 determines whether any of the predicted incorrectly identified failed components match the predicted failed components, and removes given ones of the predicted failed components matching with the predicted incorrectly identified failed components. The final predicted components (block 505) comprise remaining ones of the predicted failed components following the removal.

Referring back to FIG. 2, as noted above, the customer care/technical support agents 252 use guided resolution steps 257 in an attempt to identify and/or gather details about a problem and what components may have failed and/or malfunctioned. During the guided resolution steps 257, a machine learning (ML) engine 230, which is the same or similar to the machine learning engine 130 described in connection with FIG. 1, performs the prediction of failed components using the first second knowledge databases 133-1 and 133-2 as described herein for a given technical support ticket or case. Following removal of false positives as described herein, the machine learning engine 230 returns predicted failed components 258 as per step 505 in FIG. 5 to the customer care/technical support agents 252. The customer care/technical support agents 252 may rely on the received predicted failed components 258 when interacting with a customer 251 during guided resolution. In addition, based on the predicted failed components 258, as per block 260, the customer care/technical support agents 252 can dispatch the predicted failed components to support service providers 261 and/or third-party logistics entities 262 for service, replacement and/or diagnostic testing of the predicted failed components.

Figure 6:
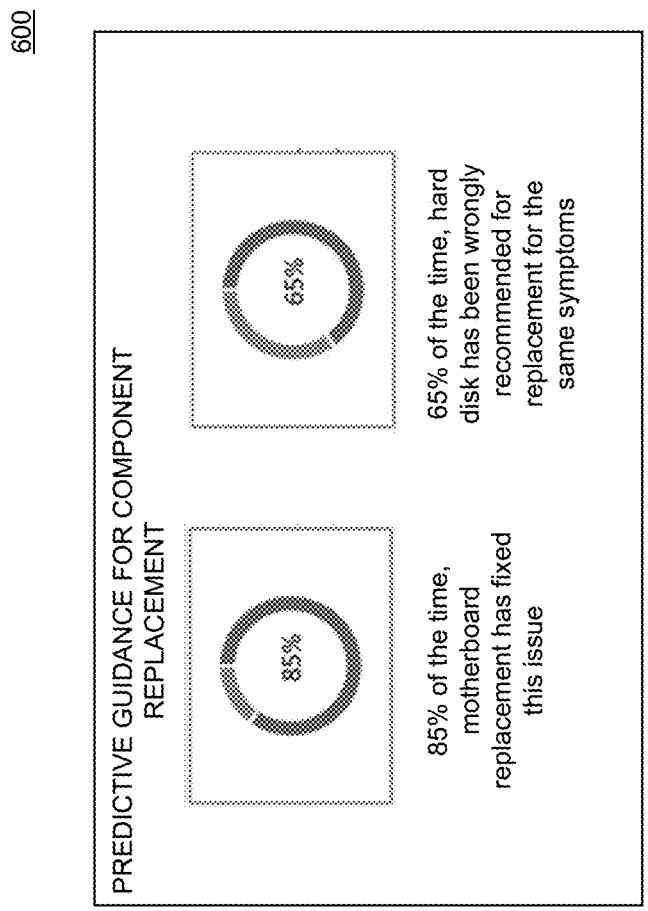
FIG. 6 depicts predictive guidance for component replacement provided to a user according to an illustrative embodiment.

According to one or more embodiments, the customer care/technical support agents 252 are also supplied with listings of the predicted NFF components 259 (i.e., components predicted to be incorrectly identified as having failed as per step 503 in FIG. 5) for given technical support tickets or cases. For example, referring to FIG. 6, the customer care/technical support agents 252 (or users via user devices 102) are provided with predictive guidance for component replacement 600 or other similar visualization which provides information about the components found to fail in a given set of circumstances, and components incorrectly identified as being the cause of the a problem in the given set of circumstances. In the non-limiting example in FIG. 6, a motherboard is identified 85% of the time as being the failed component for a particular problem, while 65% of the time, a hard disk is wrongly identified as being the failed component in the same circumstances. Armed with this information, customer care/technical support agents 252 can make more informed and accurate decisions when deciding the root cause of computing environment issues. According to an embodiment, the machine learning engine 230 performs the prediction to generate the predicted failed components 258 and/or the predicted NFF components 259 in real-time while the customer care/technical support agents 252 are interacting with customers 251 or in real-time following generation of a technical support ticket or case.

According to one or more embodiments, the databases 108, 109, 122 and 133 used herein can be configured according to a relational database management system (RDBMS) (e.g., PostgreSQL). Databases 108, 109, 122 and 133 in some embodiments are implemented using one or more storage systems or devices associated with the component failure prediction platform 110. In some embodiments, one or more of the storage systems utilized to implement the databases comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the component failure prediction platform 110, the data gathering engine 120 and the machine learning engine 130 in other embodiments can be implemented at least in part externally to the component failure prediction platform 110, for example, as stand-alone servers, sets of servers or other types of systems coupled to the network 104. For example, the data gathering engine 120 and the machine learning engine 130 may be provided as cloud services accessible by the component failure prediction platform 110.

The data gathering engine 120 and the machine learning engine 130 in the FIG. 1 embodiment are each assumed to be implemented using at least one processing device. Each such processing device generally comprises at least one processor and an associated memory, and implements one or more functional modules for controlling certain features of the data gathering engine 120 and/or the machine learning engine 130.

At least portions of the component failure prediction platform 110 and the components thereof may be implemented at least in part in the form of software that is stored in memory and executed by a processor. The component failure prediction platform 110 and the components thereof comprise further hardware and software required for running the component failure prediction platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data gathering engine 120, the machine learning engine 130 and other components of the component failure prediction platform 110 in the present embodiment are shown as part of the component failure prediction platform 110, at least a portion of the data gathering engine 120, the machine learning engine 130 and other components of the component failure prediction platform 110 in other embodiments may be implemented on one or more other processing platforms that are accessible to the component failure prediction platform 110 over one or more networks. Such components can each be implemented at least in part within another system element or at least in part utilizing one or more stand-alone components coupled to the network 104.

It is assumed that the component failure prediction platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data gathering engine 120, the machine learning engine 130 and other components of the component failure prediction platform 110, and the elements thereof can each be implemented in the form of one or more LXCs running on one or more VMs. Other arrangements of one or more processing devices of a processing platform can be used to implement the data gathering engine 120 and the machine learning engine 130 as well as other components of the component failure prediction platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the component failure prediction platform 110 to reside in different data centers. Numerous other distributed implementations of the component failure prediction platform 110 are possible.

Accordingly, one or each of the data gathering engine 120, the machine learning engine 130 and other components of the component failure prediction platform 110 can each be implemented in a distributed manner so as to comprise a plurality of distributed components implemented on respective ones of a plurality of compute nodes of the component failure prediction platform 110.

It is to be appreciated that these and other features of illustrative embodiments are presented by way of example only, and should not be construed as limiting in any way.

Accordingly, different numbers, types and arrangements of system components such as the data gathering engine 120, the machine learning engine 130 and other components of the component failure prediction platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the component failure prediction platform can be offered to cloud infrastructure customers or other users as part of FaaS, CaaS and/or PaaS offerings.

Figure 11:
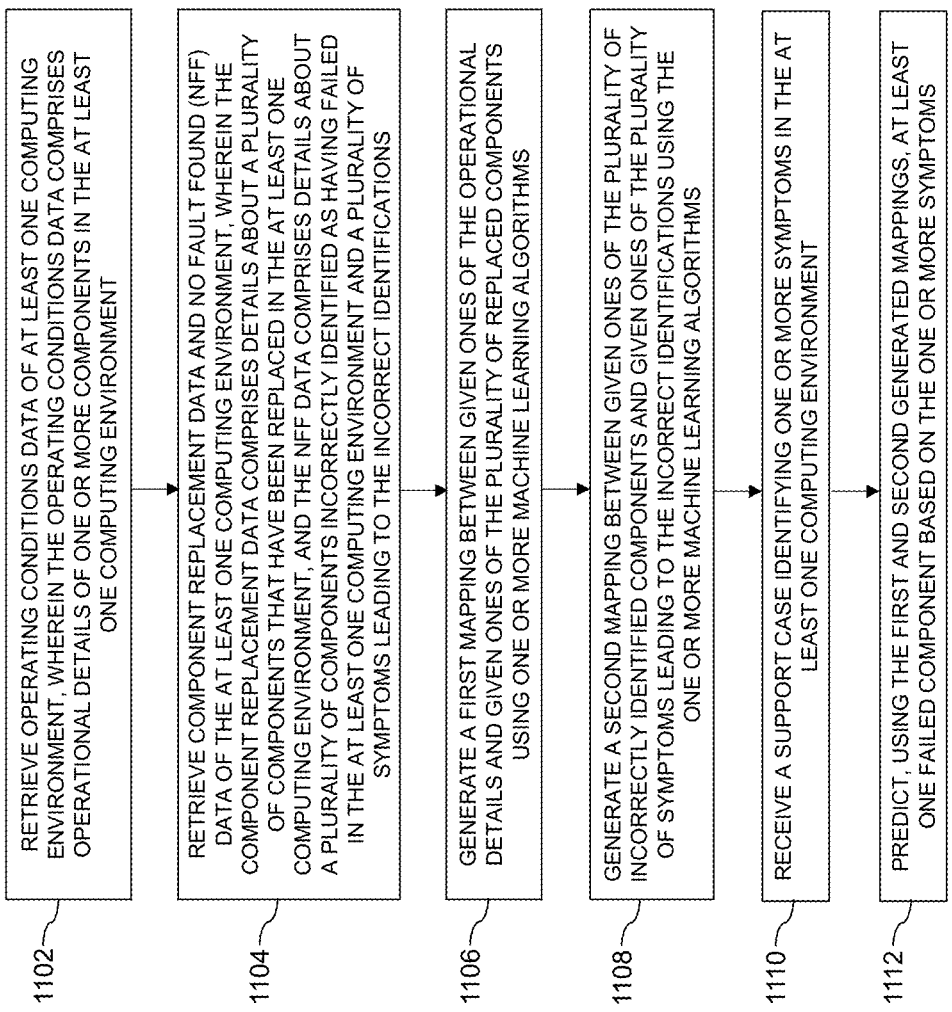
FIG. 11 depicts a process for automatically predicting failed components in computing environments according to an illustrative embodiment.

The operation of the information processing system 100 will now be described in further detail with reference to the flow diagram of FIG. 11. With reference to FIG. 11, a process 1100 for automatically predicting failed components as shown includes steps 1102 through 1112, and is suitable for use in the system 100 but is more generally applicable to other types of information processing systems comprising a component failure prediction platform configured for automatically predicting failed components.

In step 1102, operating conditions data of at least one computing environment is retrieved. The operating conditions data comprises operational details of one or more components in the at least one computing environment. According to an embodiment, the operational details comprise a plurality of events that occurred in the at least one computing environment. The plurality of events may comprise one or more of a scan failure, a read failure, a write failure, a memory failure, a component temperature exceeding a given temperature threshold, paging activity exceeding a given activity threshold, a crash of the one or more components and a MAC address change.

In step 1104, component replacement data and NFF data of the at least one computing environment is retrieved. The component replacement data comprises details about a plurality of components that have been replaced in the at least one computing environment. The NFF data comprises details about a plurality of components incorrectly identified as having failed in the at least one computing environment and a plurality of symptoms leading to the incorrect identifications. In embodiments, the plurality of symptoms comprise a warning indication, a failed operation, reduced performance, a lack of power and/or intermittent functionality.

In step 1106, a first mapping is generated between given ones of the operational details and given ones of the plurality of replaced components using one or more machine learning algorithms. According to an embodiment, the one or more machine learning algorithms are configured to cluster the plurality of replaced components according to one or more categories of the operational details.

In step 1108, a second mapping is generated between given ones of the plurality of incorrectly identified components and given ones of the plurality of symptoms leading to the incorrect identifications using the one or more machine learning algorithms. According to an embodiment, the one or more machine learning algorithms are configured to cluster the plurality of incorrectly identified components according to one or more of the plurality of symptoms. For example, the plurality of incorrectly identified components are clustered according to one or more error descriptions associated with the plurality of symptoms.

In step 1110, a support case is received identifying one or more symptoms in the at least one computing environment. In step 1112, using the first and second generated mappings, at least one failed component is predicted based on the one or more symptoms. According to an embodiment, the predicting comprises predicting a plurality of failed components based on the first mapping, and predicting one or more incorrectly identified failed components based on the second mapping. The predicting also comprises determining whether any of the predicted one or more incorrectly identified failed components match the predicted plurality of failed components, and removing given ones of the predicted plurality of failed components matching with the predicted one or more incorrectly identified failed components. The predicted at least one component comprises remaining ones of the predicted plurality of failed components following the removal. The prediction can be transmitted to a user over a communications network. For example, a visualization of the predicted plurality of failed components, of the predicted one or more incorrectly identified failed components and/or of the predicted at least one component can be generated by the platform 110 and transmitted to the user over the communications network.

In one or more embodiments, the component replacement data and the NFF data is filtered from CRM data retrieved from one or more databases. In addition, the process may also include transforming at least one of the operating conditions data, the component replacement data and the (NFF) data into one or more word vectors, and training the one or more machine learning algorithms with the one or more word vectors. According to an embodiment, tf-idf analysis is applied to at least one of the operating conditions data, the component replacement data and the NFF data.

It is to be appreciated that the FIG. 11 process and other features and functionality described above can be adapted for use with other types of information systems configured to execute component failure prediction services in a component failure prediction platform or other type of platform.

The particular processing operations and other system functionality described in conjunction with the flow diagram of FIG. 11 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 11 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a component failure prediction platform as disclosed herein can provide a number of significant advantages relative to conventional arrangements. For example, unlike conventional techniques, the embodiments advantageously use machine learning techniques to provide automatic prediction of failed components by combining first identified patterns between operating conditions data and past component replacements with second identified patterns corresponding to relationships between symptoms and returned NFF components to accurately and efficiently predict components that may have failed.

Unlike conventional techniques, the embodiments use machine learning techniques to predict failure of components by combining historical operating conditions data from systems and technical analysis data from returned NFF components. The embodiments advantageously determine components that have been wrongly identified as failing in different circumstances, and use the wrongly identified components as a basis for removal of false positives from predictions of failed components. As a result, the component failure prediction platform of the embodiments produces more accurate predictions than with conventional techniques, since false positive results are eliminated.

The machine learning algorithms advantageously rely on numerous data points including, but not necessarily limited to, operating conditions data comprising, for example, events and performance metrics of a computing environment, and data from CRM databases such as, component replacement data and NFF data including symptoms and/or conditions leading to incorrect identifications of failed components.

Advantageously, the embodiments provide customer support personnel with a visualization of predicted failed components and/or predicted incorrectly identified failed components that can be used in real-time during a guided resolution process with a customer. In addition, customer support personnel can be provided with data about the components predicted to fail in a given set of circumstances, and components predicted to be incorrectly identified as being the cause of a problem in the given set of circumstances. Accordingly, customer care/technical support agents can make more informed and accurate decisions when deciding the root cause of computing environment issues, saving time and computing resources.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the component failure prediction platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a component failure prediction platform in illustrative embodiments. These and other cloud-based systems in illustrative embodiments can include object stores.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
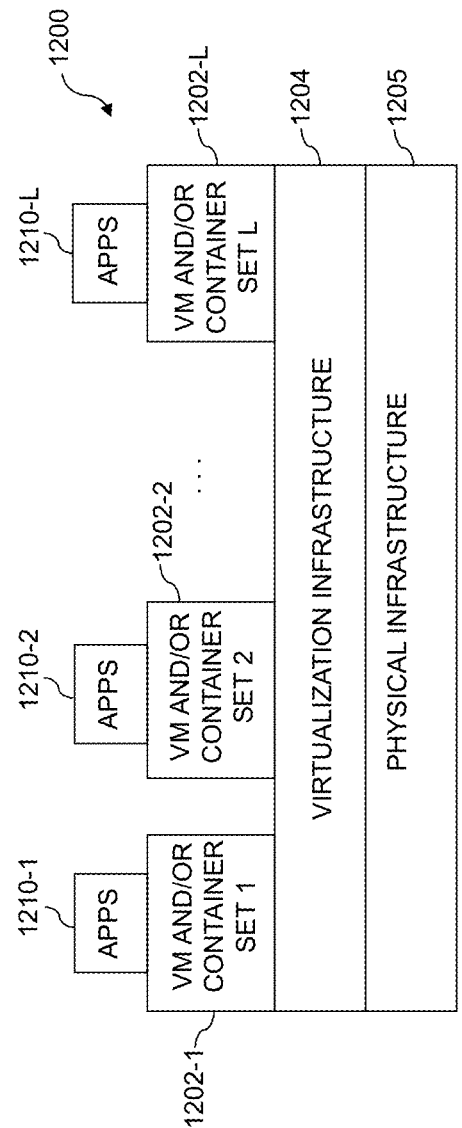
FIGS. 12 and 13 show examples of processing platforms that may be utilized to implement at least a portion of an information processing system according to illustrative embodiments.
Figure 13:
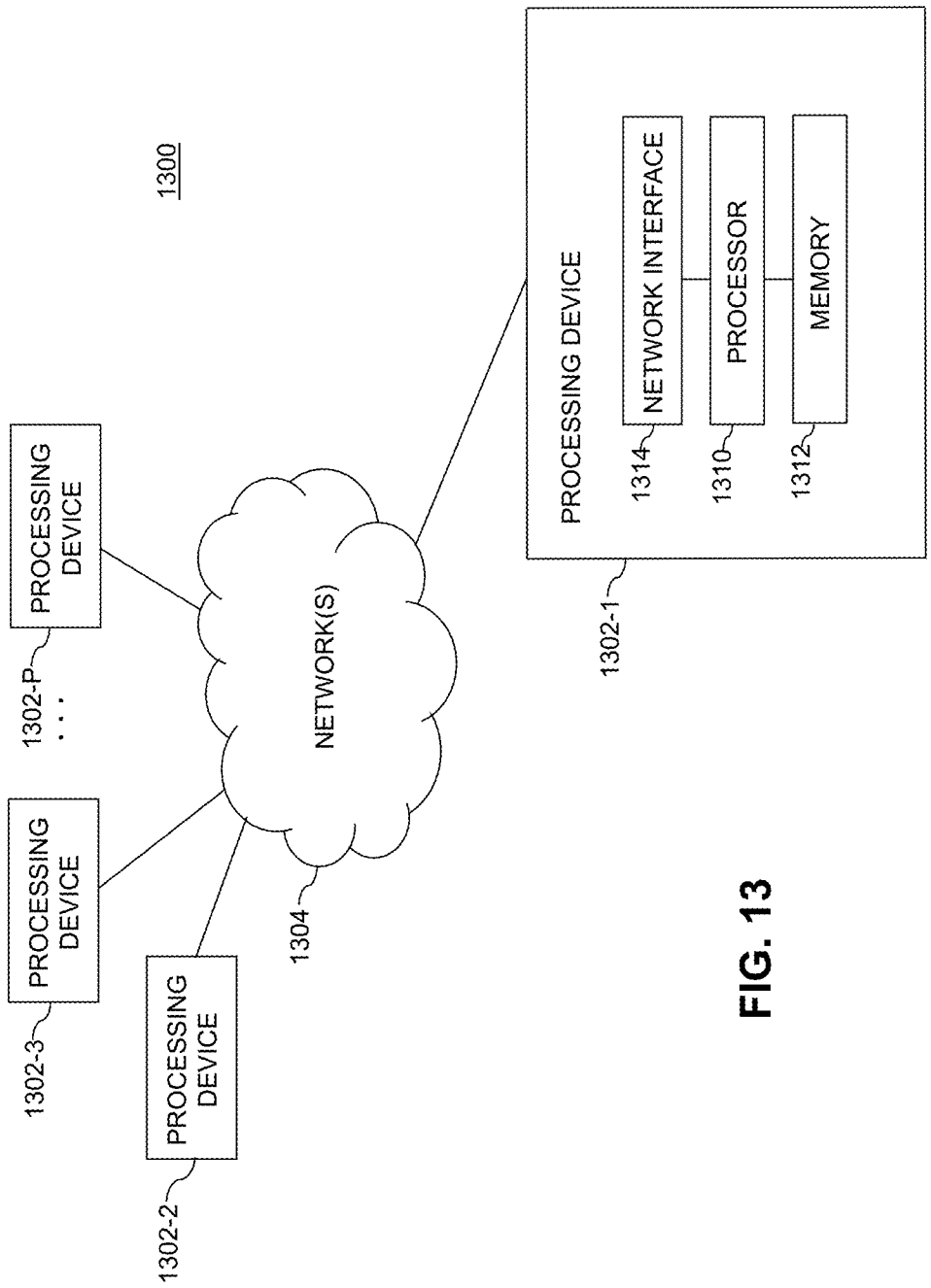

FIG. 12 shows an example processing platform comprising cloud infrastructure 1200. The cloud infrastructure 1200 comprises a combination of physical and virtual processing resources that may be utilized to implement at least a portion of the information processing system 120. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-P, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312. The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the component failure prediction platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and component failure prediction platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising a plurality of processing devices;
   said at least one processing platform being configured:
   to retrieve operating conditions data of at least one computing environment;
   wherein the operating conditions data comprises operational details of one or more components in the at least one computing environment;
   to retrieve component replacement data and no fault found data of the at least one computing environment;
   wherein the component replacement data comprises details about a plurality of components that have been replaced in the at least one computing environment;
   wherein the no fault found data comprises details about a plurality of components incorrectly identified as having failed in the at least one computing environment and a plurality of symptoms leading to the incorrect identifications;
   to generate a first mapping between given ones of the operational details and given ones of the plurality of replaced components using one or more machine learning algorithms;
   to generate a second mapping between given ones of the plurality of incorrectly identified components and given ones of the plurality of symptoms leading to the incorrect identifications using the one or more machine learning algorithms;
   to receive a support case identifying one or more symptoms in the at least one computing environment; and
   to predict, using the first and second generated mappings, at least one failed component based on the one or more symptoms.

2. The apparatus of claim 1 wherein the one or more machine learning algorithms are configured to cluster the plurality of replaced components according to one or more categories of the operational details.

3. The apparatus of claim 1 wherein the one or more machine learning algorithms are configured to cluster the plurality of incorrectly identified components according to one or more of the plurality of symptoms.

4. The apparatus of claim 1 wherein the one or more machine learning algorithms are configured to cluster the plurality of incorrectly identified components according to one or more error descriptions associated with the plurality of symptoms.

5. The apparatus of claim 1 wherein said at least one processing platform is further configured to filter the component replacement data and the no fault found data from customer relationship management data retrieved from one or more databases.

6. The apparatus of claim 1 wherein the operational details comprise a plurality of events that occurred in the at least one computing environment.

7. The apparatus of claim 6 wherein the plurality of events comprise one or more of a scan failure, a read failure, a write failure, a memory failure, a component temperature exceeding a given temperature threshold, paging activity exceeding a given activity threshold, a crash of the one or more components and a media access control address (MAC address) change.

8. The apparatus of claim 1 wherein, in predicting the at least one failed component, said at least one processing platform is configured:
   to predict a plurality of failed components based on the first mapping; and
   to predict one or more incorrectly identified failed components based on the second mapping.

9. The apparatus of claim 8 wherein, in predicting the at least one failed component, said at least one processing platform is further configured:
to determine whether any of the predicted one or more incorrectly identified failed components match the predicted plurality of failed components; and
to remove given ones of the predicted plurality of failed components matching with the predicted one or more incorrectly identified failed components;
wherein the predicted at least one failed component comprises remaining ones of the predicted plurality of failed components following the removal.

10. The apparatus of claim 9 wherein said at least one processing platform is further configured:
to generate a visualization of one or more of the predicted plurality of failed components, the predicted one or more incorrectly identified failed components and the predicted at least one failed component; and
to transmit the visualization to a user over a communications network.

11. The apparatus of claim 1 wherein the plurality of symptoms comprise at least one of a warning indication, a failed operation, reduced performance, a lack of power and intermittent functionality.

12. The apparatus of claim 1 wherein said at least one processing platform is further configured to transmit the prediction to a user over a communications network.

13. The apparatus of claim 1 wherein said at least one processing platform is further configured:
to transform at least one of the operating conditions data, the component replacement data and the no fault found data into one or more word vectors; and
to train the one or more machine learning algorithms with the one or more word vectors.

14. The apparatus of claim 1 wherein said at least one processing platform is further configured to apply term frequency-inverse document frequency analysis to at least one of the operating conditions data, the component replacement data and the no fault found data.

15. A method comprising:
retrieving operating conditions data of at least one computing environment;
wherein the operating conditions data comprises operational details of one or more components in the at least one computing environment;
retrieving component replacement data and no fault found data of the at least one computing environment;
wherein the component replacement data comprises details about a plurality of components that have been replaced in the at least one computing environment;
wherein the no fault found data comprises details about a plurality of components incorrectly identified as having failed in the at least one computing environment and a plurality of symptoms leading to the incorrect identifications;
generating a first mapping between given ones of the operational details and given ones of the plurality of replaced components using one or more machine learning algorithms;
generating a second mapping between given ones of the plurality of incorrectly identified components and given ones of the plurality of symptoms leading to the incorrect identifications using the one or more machine learning algorithms;
receiving a support case identifying one or more symptoms in the at least one computing environment; and
predicting, using the first and second generated mappings, at least one failed component based on the one or more symptoms;
wherein the method is performed by at least one processing platform comprising at least one processing device comprising a processor coupled to a memory.

16. The method of claim 15 wherein predicting the at least one failed component comprises:
predicting a plurality of failed components based on the first mapping; and
predicting one or more incorrectly identified failed components based on the second mapping.

17. The method of claim 16 wherein predicting the at least one failed component further comprises:
determining whether any of the predicted one or more incorrectly identified failed components match the predicted plurality of failed components; and
removing given ones of the predicted plurality of failed components matching with the predicted one or more incorrectly identified failed components;
wherein the predicted at least one failed component comprises remaining ones of the predicted plurality of failed components following the removal.

18. A computer program product comprising a non-transitory processor-readable storage medium having stored therein program code of one or more software programs, wherein the program code when executed by at least one processing platform causes said at least one processing platform:
to retrieve operating conditions data of at least one computing environment;
wherein the operating conditions data comprises operational details of one or more components in the at least one computing environment;
to retrieve component replacement data and no fault found data of the at least one computing environment;
wherein the component replacement data comprises details about a plurality of components that have been replaced in the at least one computing environment;
wherein the no fault found data comprises details about a plurality of components incorrectly identified as having failed in the at least one computing environment and a plurality of symptoms leading to the incorrect identifications;
to generate a first mapping between given ones of the operational details and given ones of the plurality of replaced components using one or more machine learning algorithms;
to generate a second mapping between given ones of the plurality of incorrectly identified components and given ones of the plurality of symptoms leading to the incorrect identifications using the one or more machine learning algorithms;
to receive a support case identifying one or more symptoms in the at least one computing environment; and
to predict, using the first and second generated mappings, at least one failed component based on the one or more symptoms.

19. The computer program product according to claim 18 wherein, in predicting the at least one failed component, the program code causes said at least one processing platform:
to predict a plurality of failed components based on the first mapping; and
to predict one or more incorrectly identified failed components based on the second mapping.

20. The computer program product according to claim 19 wherein, in predicting the at least one failed component, the program code further causes said at least one processing platform:
    to determine whether any of the predicted one or more incorrectly identified failed components match the predicted plurality of failed components; and
    to remove given ones of the predicted plurality of failed components matching with the predicted one or more incorrectly identified failed components;
    wherein the predicted at least one failed component comprises remaining ones of the predicted plurality of failed components following the removal.

\* \* \* \* \*